United States Patent
Little et al.

(10) Patent No.: US 12,206,142 B2
(45) Date of Patent: Jan. 21, 2025

(54) ALKALINE AQUEOUS FERRIC IRON SALT SOLUTION ELECTROLYTES AND BATTERIES MADE THEREFROM

(71) Applicant: New Sky Energy, LLC, Longmont, CO (US)

(72) Inventors: Charles Deane Little, Ngmont, CO (US); Yasmina Yeager, Denver, CO (US)

(*) Notice: Subject to any disclaimer, the term of this patent is extended or adjusted under 35 U.S.C. 154(b) by 294 days.

(21) Appl. No.: 17/726,134

(22) Filed: Apr. 21, 2022

(65) Prior Publication Data

US 2022/0344692 A1 Oct. 27, 2022

Related U.S. Application Data

(60) Provisional application No. 63/177,683, filed on Apr. 21, 2021.

(51) Int. Cl.
*H01M 8/08* (2016.01)
*H01M 8/18* (2006.01)
*H01M 12/06* (2006.01)

(52) U.S. Cl.
CPC ............. *H01M 8/08* (2013.01); *H01M 8/188* (2013.01); *H01M 12/06* (2013.01); *H01M 2300/0002* (2013.01)

(58) Field of Classification Search
CPC ........ H01M 8/08; H01M 8/188; H01M 12/06; H01M 2300/0002; H01M 8/04186
See application file for complete search history.

(56) References Cited

U.S. PATENT DOCUMENTS

2021/0083309 A1* 3/2021 Hammad ............ H01M 8/1037
2022/0064030 A1* 3/2022 Suss .................... C02F 1/46104
2023/0051504 A1* 2/2023 Accogli ............ H01M 10/0562

* cited by examiner

*Primary Examiner* — Stewart A Fraser
(74) *Attorney, Agent, or Firm* — Derek Fahey, Esq.; The Plus IP Firm, LLC

(57) ABSTRACT

An electrochemical cell is disclosed. The electrochemical cell comprises an anode side, a cathode side, a separator, and an alkaline aqueous ferric iron salt solution. The alkaline aqueous ferric iron salt solution may be either the catholyte or the anolyte, depending on the electrochemical half-reactions that define the electrochemical cell. The alkaline aqueous ferric iron salt solution comprises one or more anionic ferric iron-carbonate complexes.

19 Claims, 2 Drawing Sheets

ALKALINE AQUEOUS FERRIC IRON SALT SOLUTION ELECTROLYTES AND BATTERIES MADE THEREFROM

CROSS-REFERENCE TO RELATED APPLICATIONS

This application claims the benefit of the filing date of U.S. Provisional Application Ser. No. 63/177,683 titled "Alkaline Aqueous Ferric Iron Salt Solution Electrolytes and Batteries Made Therefrom" and filed Apr. 21, 2021 and the subject matter of which is incorporated herein by reference.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The present invention relates to electrochemical cells having an aqueous electrolyte or electrolytes comprising iron, specifically anionic iron carbonate complexes.

BACKGROUND

In order for widespread adoption of renewable energy to occur, the cost of renewable energy will need to become more cost competitive with fossil fuel sources of energy, such as coal and natural gas. That being said, current sources of renewable energy, such as polycrystalline silicon photovoltaic cells, are cost competitive with fossil fuel sources of energy. However, solar energy predictably suffers from the problem of intermittency. In other words, without efficient energy storage solar energy cannot be used to replace traditional fossil fuel sources of energy because the solar energy is only produced during the day when the sun is shining. In order to utilize solar energy and other intermittent renewable sources of energy, there must be cost effective methods for storing said energy.

Batteries are a common method of storing and discharging energy. Other methods of storing energy could be used, such as hydroelectric energy, or compressed-air energy storage. However, these methods of storing energy require significant investment in infrastructure. Batteries on the other hand may be able to offer similarly cost-effective methods for storing renewable energy at any scale. However, in order for more widespread adoption of renewable energy, there exists a need to develop more cost-effective batteries.

SUMMARY

An electrochemical cell is disclosed. More specifically, the electrochemical cell described includes an alkaline aqueous ferric iron salt solution as an electrolyte (e.g., catholyte, anolyte). This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, an electrochemical cell is disclosed. The electrochemical cell comprises an anode side, a cathode side, a separator, and an alkaline aqueous ferric iron salt solution. The anode side includes at least one anode and an anolyte (i.e., an electrolyte in proximity to the anode), and the cathode side includes at least one cathode and a catholyte (i.e., an electrolyte in proximity to the cathode). The electrochemical cell includes a separator that separates the anode side from the cathode side. More particularly, the separator allows for the passage of charge carriers (e.g., cations) to facilitate the transfer of electrochemical energy. The alkaline aqueous ferric iron salt solution may be either the catholyte or the anolyte, depending on the electrochemical half-reactions that define the electrochemical cell. The alkaline aqueous ferric iron salt solution comprises one or more anionic ferric iron-carbonate complexes.

Additional aspects of the disclosed embodiments will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein.

DETAILED DESCRIPTION

Figure 1:
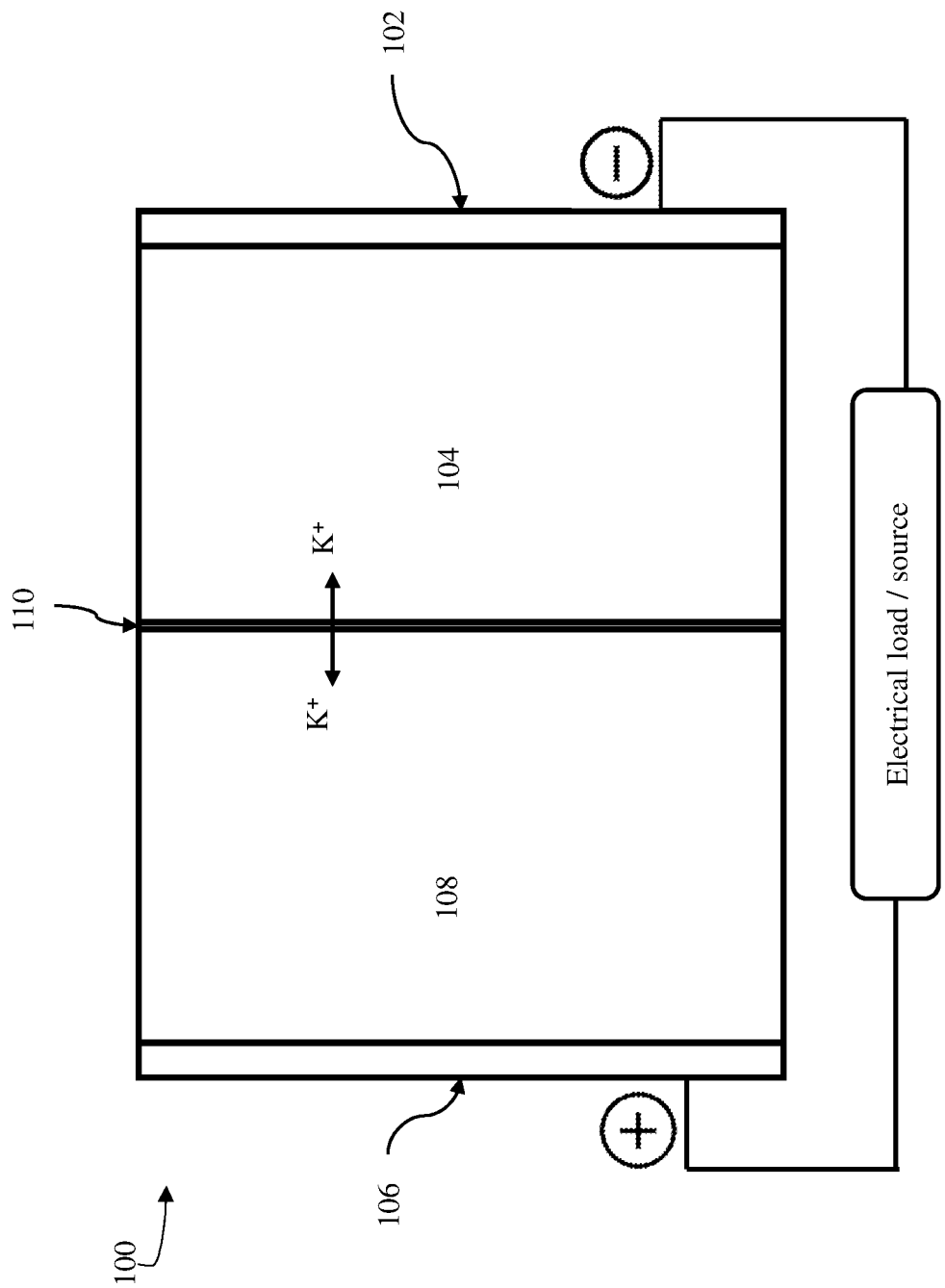
FIG. 1 is a diagram of an electrochemical cell.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

As noted above, the electrochemical cells generally comprise at least one alkaline aqueous ferric iron salt solution. Alkaline aqueous ferric iron salt solutions may provide various advantages over existing electrolyte solutions. For instance, the described alkaline aqueous ferric iron solutions may be advantageous due to the wide range of pH that the ferric iron is soluble. For instance, the solutions are known to be soluble in an excess of 0.5 mols/L, and are soluble in an order of magnitude range of approximately 0.01 to 1.0 mols/L. In one embodiment, the molarity of the ferric ions is from 0.005 to 3.0 mols/L.

An additional benefit may be the corrosivity of the solutions. The described solutions are alkaline, which may reduce and/or eliminate the corrosion of current collector materials, relative to existing iron-based redox reactions (e.g., acidic redox reactions).

The alkaline aqueous ferric iron salt solutions can also be produced from low-cost, safe, and abundant materials. For instance, the alkaline aqueous ferric iron salt solutions may be produced by combining aqueous solutions and/or solids of ferric salts (e.g., ferric nitrate), potassium carbonate, and potassium bicarbonate. Such raw materials are advantageously inexpensive and abundant. These materials are also recognized as being generally safe. This might be an advantage over certain types of batteries, such as cyanide-based electrolytes which pose potential health risks during their production and use. Thus, in one embodiment the electrolyte comprising the alkaline aqueous ferric iron salt solution is free of iron cyanide complexes. Additionally, the alkaline aqueous ferric iron salt solutions do not represent a risk of disposal. Due to the materials used, the solutions can be readily disposed of in landfills or even in wastewater.

The alkaline aqueous ferric iron salt solutions may also have low amounts, or even be free of organic additives. For instance, organic additive ligands that complex iron may be unnecessary due to the discovered solubility of the ferric ions in the described solutions. The reduction of organic additives that complex iron may also improve the kinetics of reaction, because such organic additives are typically bulky bidentate ligands and above (e.g., tridentate, quadridentate, etc.) that inhibit chemical reaction at electrode surfaces, and consequently have poor kinetics.

Another potential advantage of the present invention is that the ferric iron carbonate complexes are believed to be primarily, if not completely, anions themselves. As described herein, ion-specific membranes may be used to facilitate the transfer of charged species from the catholyte to the anolyte, and vice versa. Since the ferric iron carbonate complexes are believed to be anions, the amount of ferric iron that may cross the separator may be reduced or eliminated when a cation-specific exchange membrane is used as a separator.

Figure 2:
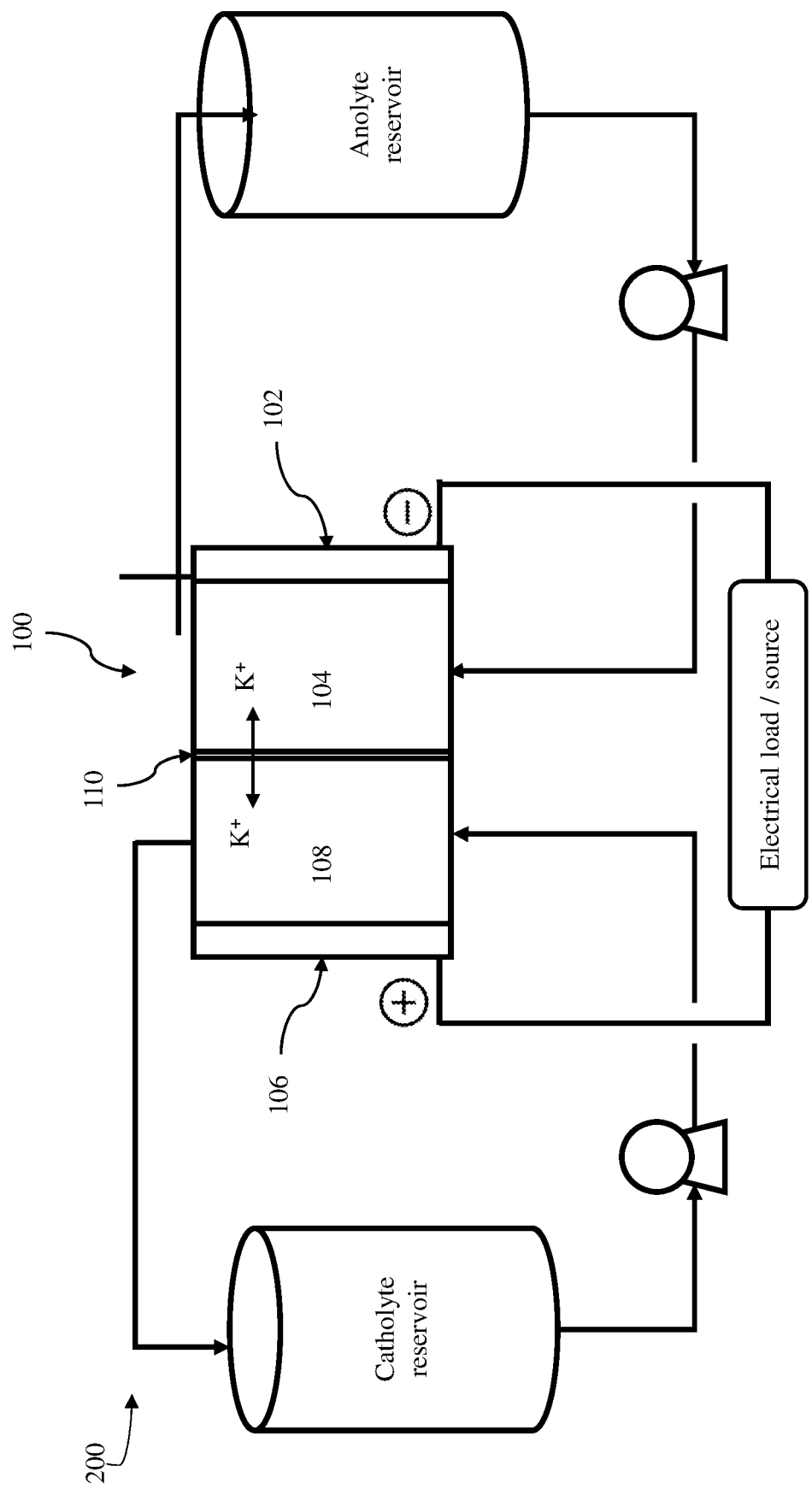
FIG. 2 is a diagram of a redox flow battery.

Referring now to FIGS. 1-2, two types of electrochemical cells are shown. In FIG. 1, a more typical electrochemical cell 100 is shown. As illustrated, the electrochemical cell comprises an anode side comprising an anode 102 and an anolyte 104, a cathode side comprising a cathode 106 and a catholyte 108, and a separator 110 separating the anode side from the cathode side. Multi-cell electrochemical cells may also be used. For instance, an intermediate electrolyte and an intermediate portion of the electrochemical cell may facilitate charge transfer from the catholyte to the anolyte and vice versa.

As will be discussed in greater detail below, the embodiments of the present invention include an alkaline aqueous ferric iron salt solution that comprises one or more anionic ferric iron-carbonate complexes. Depending on the combinations of catholyte and anolyte that is used, any appropriate cathode material and/or anode material may be used. For instance, carbon-based electrode materials may be used, such as carbon felts, fabrics, or other carbon electrodes. Such electrodes may be doped with catalysts, such as noble metal catalysts. Other dopants, such as dopant materials that suppress unwanted side reactions (e.g., water splitting, hydrogen evolution, etc.).

As noted above, the described alkaline aqueous ferric iron salt solutions may be useful as one or more of an anolyte and catholyte. An anolyte 104 is an electrolyte that is in proximity to the anode 102 in an electrochemical cell. A catholyte 108 is an electrolyte that is in proximity to the cathode 106 in an electrochemical cell. In a redox flow battery, the anolyte is the electrolyte that flows on the anode portion of the cell and the catholyte is the electrolyte that flows on the cathode portion of the cell.

A number of chemical reactions may drive the electrochemical cell. The chemical half-reactions may include: $Fe^{3+}+e^- \rightarrow Fe^{2+}$ (reduction of ferric ions to ferrous ions) and the corresponding reversed half-reaction. In this regard, the half-reactions may generally include reducing ferric ions of anionic ferric carbonate complexes to ferrous ions. The ferrous ions may similarly be complexed by inorganic ligands in the solution, such as one or more of water ($H_2O$), hydroxide ($OH^-$), bicarbonate ($HCO_3^-$), carbonate ($CO_3^{2-}$), among other ligands. Organic additives may be used (e.g., polyols such as sorbitol) that may stabilize the ferric- and/or ferrous-complexes.

In one aspect, soluble ferric complex species may be reduced to soluble ferrous complex species as described above. However, hybrid electrochemical cells (e.g., solid suspensions in liquids) may also be used with the alkaline aqueous ferric iron salt solutions. In this regard, insoluble ferrous species may be formed by the reduction of ferric carbonate complexes. Moreover, insoluble intermediate ferrous species may be formed by the oxidation of zerovalent iron. Thus, insoluble ferrous species may form and are considered to be within the spirit and scope of the invention.

As will become apparent from the foregoing description, alkaline aqueous ferric iron salt solutions may comprise potassium in molar excess of iron. As such, the potassium ions ($K^+$) may be transported across the separator 110 in the electrochemical cell. The separator may be any suitable separator, such as an ion-selective membrane, specifically a cation-selective membrane. In one embodiment, the ion-selective membrane is a sulfonated tetrafluoroethylene-based fluoropolymer-copolymer membrane, such as a membrane made from NAFION®.

While potassium ions may be a preferred charge transport species in the described electrochemical cells, a membrane such as a NAFION® membrane may also transport other ions, such as sodium ions ($Na^+$). While not being bound by any theory, the solubility of the ferric carbonate complexes may decrease as sodium is added to, or replaced with potassium in the alkaline aqueous ferric iron solutions. Thus, sodium salts may not be preferred in the catholyte and/or anolyte. However, sodium may be added in amounts that increase ion transport (i.e., sodium ions ($Na^+$)) across the separator 110 in the electrochemical cell without substantially affecting the solubility of the iron carbonate complexes.

Alternative types of membranes may also be used and are within the spirit and scope of the invention. For instance, anions such as chloride anions ($Cl^-$) may be used in the electrolyte solutions in combination with an anion-selective membrane. Such variations of the separator are within the spirit and scope of the invention.

As noted above, the alkaline aqueous ferric iron salt solutions may be used as a catholyte in an electrochemical cell as a $Fe^{3+}/Fe^{2+}$ redox couple, such as the iron-sulfide $Fe^{3+}/Fe^{2+}$ and $S^{2-}/S^0$ redox couple pair described below. However, the alkaline aqueous ferric iron salt solutions may be used in a variety of redox couple pairs where the catholyte includes the above-described $Fe^{3+}/Fe^{2+}$ redox couple. For instance, the anolyte in such redox couples may include at least one of a $Cr^{3+}/Cr^{2+}$ redox couple, a $V^{3+}/V^{2+}$ redox couple, a $Zn/Zn(OH)_4^{2-}$ redox couple, a $TiO^{2+}/Ti^{3+}$ redox couple, and a $Cu^{2+}/Cu$ redox couple.

An Iron-Sulfide Battery

In one embodiment, the alkaline aqueous ferric iron solution is the catholyte. At the catholyte, ferric ions of the ferric carbonate complexes may be reduced to ferrous ions during discharge. In such embodiments, the electrochemical cell may comprise any suitable anolyte. In one embodiment, the anolyte may comprise sulfide ($S^{2-}$). For instance, the anolyte may comprise a solution of one or more of: potassium sulfide, potassium carbonate, and potassium bicarbonate. Potassium hydroxide may also be used. In an electrochemical cell of this type, the anode of such an electrochemical cell may comprise elemental sulfur. During discharge, the sulfide anions may be oxidized into elemental sulfur. Solutions having an excess of sulfide may be capable of dissolving the elemental sulfur to form polysulfide compounds (e.g., anionic polysulfides). In this regard, the iron-sulfide redox couple may be advantageous due to the ability of sulfide solutions to dissolve elemental sulfur, which increases the storage capacity of the electrolyte solution.

An All-Iron Battery

An all-iron battery may be created from the alkaline aqueous ferric iron salt solutions. The envisioned all-iron battery would include a catholyte that comprises (or consists of) a alkaline aqueous ferric iron salt solution. Moreover, iron-based electrodes, may be used. In particular, the anode may comprise zerovalent iron ($Fe^0$). In such a battery, the reactions may comprise:

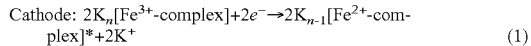

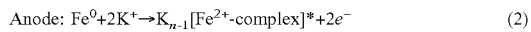

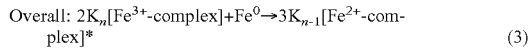

*Insoluble ferrous species may also form and be used and are within the spirit and scope of the invention.

In such an electrochemical cell, the cell may first be loaded with an iron-containing anode, a catholyte comprising the alkaline aqueous ferric iron salt solution, and an anolyte. The anolyte may be a solution that is similar to the alkaline aqueous ferric iron salt solution in terms of pH and electrolyte composition (i.e., a similar solution of potassium salts of carbonate and/or bicarbonate, optionally with nitrate). Prior to operating the electrochemical cell, the anolyte may be noticeably absent of an aqueous charge carrier. In other words, the anolyte may not include a charge carrier like the ferric carbonate complex of the catholyte.

During discharge in the envisioned electrochemical cell, ferric ions of the ferric carbonate complexes may be reduced to ferrous ions (e.g., ferrous complexes, ferrous precipitates), while zerovalent iron ($Fe^0$) of the anode is oxidized to ferrous ions (e.g., ferrous complexes, ferrous precipitates). To charge the electrochemical cell, the process is reversed, and ferrous ions are deposited as zerovalent iron onto the anode, and ferrous ions in the catholyte are oxidized to ferric ions.

An Iron-Air Battery

An electrochemical cell that is an iron-air battery is also envisioned. In this regard, iron-air batteries generally operate by solid-state reactions that occur at an iron- or iron-based anode while simultaneous conversion of oxygen to hydroxide at an air-breathing bifunctional cathode. Such iron-air batteries may operate in electrolytes comprising potassium hydroxide. Furthermore, such batteries generally require significant reduction, or elimination, or carbon dioxide from air. An alkaline aqueous ferric iron salt solution as described herein may be advantageous due to the presence of carbonate/bicarbonate species. Since the ferric iron is known to be stable, the air in an iron-air battery may not need to be scrubbed of carbon dioxide, since the solutions are known to tolerate high partial pressures (e.g., approximately 0.5 atm) of carbon dioxide without ill effect on the ferric carbonate complex species.

An iron-air battery with notably different characteristics is envisioned by using alkaline ferric iron carbonate complexes. As noted earlier, iron-air batteries generally operate by solid-state reactions that occur at an iron- or iron-based anode. The reaction(s) that occur generally include the oxidation of zerovalent iron to ferrous iron and/or ferric iron. The reaction(s) are solid-state, which may be beneficial from the standpoint of reducing dendrite formation. However, prior to the present invention, ferric complexes that are stable in alkaline solutions without organic ligands or strongly complexed inorganic ligands (e.g., cyanide-based ligands) were unknown.

The discovery of stable complexed ferric iron carbonate complexes may enable iron-air batteries with unique characteristics. For instance, an iron-air battery whereby zerovalent iron is converted to soluble ferric iron complexes at the anode. This may be advantageous for several reasons. First, ferrous and/or ferric oxides and oxyhydroxides may have a passivating effect at the iron- or iron-based anode. As you might expect, due to the passivation of the anode, the anode's surface area may be the limiting factor for the storage capacity of the battery. In the present invention, ferric ions form soluble and stable complexes in a potassium carbonate/bicarbonate solution. Thus, as zerovalent iron is converted to ferrous and subsequently ferric iron, the anode is dissolved into solution.

While the initial iron-air battery may not be charged with an alkaline aqueous ferric iron salt solution comprising ferric iron carbonate complexes, the alkaline aqueous ferric iron salt solution may be produced by dissolution of the iron or iron-based anode. Thus, in one embodiment an iron-air battery comprises an alkaline aqueous ferric iron salt solution as an anolyte.

An iron-air battery of this type may also be used in an entirely new arrangement as an iron-sulfide-air battery. The first cell may comprise the electrolyte and a bifunctional air-breathing cathode in fluid communication with a second cell comprising an iron or iron-based anode. Upon discharge of the first cell and second cell, solubilized ferric iron carbonate complexes may be produced in the second cell. The second cell may be in fluid communication with a third cell comprising any of the above anolytes described above. For instance, a solution of sulfides may be used as an anolyte. In this way, an oxygen-sulfide battery may be used that uses iron as an intermediary between the oxygen and sulfide. In other terms, the solution comprising the ferric iron carbonate complexes may act as an intermediary electrolyte between the catholyte and the anolyte.

Composition, Properties, and Method of Preparation

The alkaline aqueous ferric iron salt solutions of the present invention may be made in a variety of methods. The methods for making such solutions are described in U.S. patent application Ser. No. 17/076,559, which is hereby incorporated by reference for all purposes of this patent application. U.S. patent application Ser. No. 17/076,559 describes various qualities, properties, and compositions that may be useful in the electrochemical cells described herein.

The alkaline aqueous ferric iron salt solutions are generally alkaline (e.g., pH>8). In one embodiment, the pH of the solution is at least 8. In another embodiment, the pH of the solution is at least 8.5. In yet another embodiment, the pH of the solution is at least 9. In another embodiment, the pH of the solution is at least 9.5. In yet another embodiment, the pH of the solution is at least 10. In another embodiment, the pH of the solution is at least 10.5. In yet another embodiment, the pH of the solution is at least 11. In another embodiment, the pH of the solution is at least 12. In yet another embodiment, the pH of the solution is at least 13.

The alkaline aqueous ferric iron salt solutions generally include a stoichiometric excess of potassium. While not being bound by any theory, potassium is believed to be a primary influence on the solubility of the ferric ions. In one embodiment, the molar ratio of the potassium ions to the ferric ions in the solution is at least 3.0. In another embodiment, the molar ratio of the potassium ions to the ferric ions in the solution is at least 4.0. In yet another embodiment, the molar ratio of the potassium ions to the ferric ions in the solution is at least 5.0. In another embodiment, the molar ratio of the potassium ions to the ferric ions in the solution is at least 6.0. In yet another embodiment, the molar ratio of the potassium ions to the ferric ions in the solution is at least 6.6. In another embodiment, the molar ratio of the potassium ions to the ferric ions in the solution is at least 8.0. In yet another embodiment, the molar ratio of the potassium ions to the ferric ions in the solution is at least 10. In another embodiment, the molar ratio of the potassium ions to the ferric ions in the solution is at least 12.

As noted above, one benefit of the described alkaline aqueous ferric iron solutions is that expensive organic additives, such as strongly complexed organic ligands (e.g., chelating agents) may not be required to maintain the solubility of the ferric ions as ferric carbonate complexes. For instance, a sub-stoichiometric ratio of organic additives may be used (i.e., a ratio of ferric to all organic additives is greater than 1.0). In one embodiment, a molar ratio of the ferric ions to the one or more organic additives, in total, is at least 1.5. In another embodiment, a molar ratio of the ferric ions to the one or more organic additives, in total, is at least 1.5. In yet another embodiment, a molar ratio of the ferric ions to the one or more organic additives, in total, is at least 2.0. In another embodiment, a molar ratio of the ferric ions to the one or more organic additives, in total, is at least 2.5. In yet another embodiment, a molar ratio of the ferric ions to the one or more organic additives, in total, is at least 3.0. In another embodiment, a molar ratio of the ferric ions to the one or more organic additives, in total, is at least 4.0. In another embodiment, a molar ratio of the ferric ions to the one or more organic additives, in total, is at least 5.0. In another embodiment, a molar ratio of the ferric ions to the one or more organic additives, in total, is at least 7.5. In yet another embodiment, a molar ratio of the ferric ions to the one or more organic additives, in total, is at least 10. In another embodiment, a molar ratio of the ferric ions to the one or more organic additives, in total, is at least 15. In yet another embodiment, a molar ratio of the ferric ions to the one or more organic additives, in total, is at least 50.

A sub-stoichiometric ratio of each organic additive may also be used, where a ratio of ferric iron to each organic additive is greater than 1.0. In one embodiment, a molar ratio of the ferric ions to each organic additive is at least 1.5. In another embodiment, a molar ratio of the ferric ions to each organic additive is at least 1.5. In yet another embodiment, a molar ratio of the ferric ions to each organic additive is at least 2.0. In another embodiment, a molar ratio of the ferric ions to each organic additive is at least 2.5. In yet another embodiment, a molar ratio of the ferric ions to each organic additive is at least 3.0. In another embodiment, a molar ratio of the ferric ions to each organic additive is at least 4.0. In yet another embodiment, a molar ratio of the ferric ions to each organic additive is at least 5.0. In another embodiment, a molar ratio of the ferric ions to each organic additive is at least 7.5. In yet another embodiment, a molar ratio of the ferric ions to each organic additive is at least 10. In another embodiment, a molar ratio of the ferric ions to each organic additive is at least 15. In yet another embodiment, a molar ratio of the ferric ions to each organic additive is at least 50.

Suitable organic additives may comprise one or more functional groups, such as one or more hydroxyl groups, one or more carboxylic acid groups and one or amino groups, among others. In one embodiment, an organic additive is a polyol (i.e., an organic additive having at least two hydroxyl groups). In one embodiment, an organic additive is a sugar alcohol (i.e., having a chemical formula $C_nH_{2n+2}O_n$). In one embodiment, an organic additive is a linear sugar alcohol, such as any of the C3-C24 linear sugar alcohols. In one embodiment, an organic additive is a sugar alcohol, where the sugar alcohol is sorbitol (e.g., D-sorbitol, or L-sorbitol and combinations thereof). Other sugar alcohols that may be used include one or more of glycerol, erythritol, threitol, mannitol, galactitol, iditol, arabitol, ribitol, xylitol, volemitol, lactitol, maltotriitol, maltotetraitol, and polyglycitol. Any of the D- or L-isomers of these compounds may be used, as well as mixtures thereof (e.g., racemic mixtures).

Other polyol organic additives that may be suitable include monosaccharides, disaccharides, oligosaccharides and polysaccharides. In one embodiment, an organic additive is a polysaccharide, where the polysaccharide is pectin. Furthermore, extracts of plants, particularly extracts of fruits, leaves or stems of fruits may be used as an organic additive. For instance, an extract of fruit of the genus *Prunus*, or the leaves of the genus *Prunus*, or the stems of the genus *Prunus* and combinations thereof may be used. The extracts of fruits, leaves and/or stems of other plants may similarly be used.

In one embodiment, an organic additive comprises at least one carboxylic acid group. In one embodiment, an organic additive comprises at least one amino group. In one embodiment, an organic additive is an aminopolycarboxylic acid (i.e., having at least one amino group and at least two carboxylic acid groups). In one embodiment, an aminopolycarboxylic acid is ethylenediaminetetraacetic acid ("EDTA").

As noted above, the alkaline aqueous ferric iron salt solutions are preferably free of ferric iron particles (e.g., free of ferric iron precipitates). In one embodiment, an alkaline aqueous ferric iron solution is free of ferric-based particles. As used herein, "ferric-based particles" means any particles (e.g., precipitates) comprising ferric iron that may form during or after production of alkaline aqueous ferric iron salt solutions. For instance, ferric-based particles may be iron oxides, iron oxyhydroxides, mixed metal oxides and any combinations thereof. In one embodiment, an alkaline aqueous ferric iron solution is free of ferric iron oxide particles (e.g., ferrihydrite, hematite, akaganeite, goethite, lepidocrocite, and magnetite).

Ferric particles can be detected in general by any analytical method known in the art. For example, iron-based particles can be detected by filtration of any precipitate from liquid medium followed by analyzing the precipitate using inductively coupled plasma (ICP).

EXAMPLES

Example 1

A panel of experiments was performed using a variety of ferric salts and alkali metal bases. Pairwise combinations of (1) dry powders of the ferric salts (FeCl3, Fe2(SO4)3·XH2O and Fe(NO3)3·9H2O) and (2) the alkali metal bases (NaOH, KOH, Na2CO3, K2CO3, NaHCO3, and KHCO3) were placed in test tubes. The alkali metal bases were added in a ratio of 6.8 to 1 with respect to the moles of alkali metal to the moles of iron. Approximately 5 mL of water was added to each test tube and each test tube was shaken to completely mix the water with the ferric salt and alkali metal base. In the case of alkali metal carbonates, a vigorous reaction with $CO_2$ production occurred. The resulting mixture for each experiment was then visually observed for presence of particles (e.g., iron oxide particles). The results of the panel of experiments are summarized in Table 1, below. A designation of "PPT" indicates that precipitates were observed in the resulting mixture.

TABLE 1

| | Base | | | | | | |
|---|---|---|---|---|---|---|---|
| Chemicals used | NaOH | KOH | $Na_2CO_3$ | $K_2CO_3$ | $NaHCO_3$ | $KHCO_3$ | $K_2CO_3$ + $KHCO_3$* |
| $FeCl_3$ (anhydrous) | PPT | PPT | PPT | PPT | PPT | PPT | PPT |
| $Fe_2(SO_4)_3 \cdot 9H_2O$ | PPT | PPT | PPT | PPT | PPT | PPT | PPT |
| $Fe(NO_3)_3 \cdot 9H_2O$ | PPT | PPT | PPT | Soluble | PPT | PPT | PPT |

*Approximately 2 moles of bicarbonate salts were used for each mole of carbonate salts, to maintain comparable alkali metal concentrations.

As shown above in Table 1, the only combination that resulted in a fully soluble mixture upon initial mixing was the Fe(NO3)3.9H2O and K2CO3 pair.

Example 2

An alkaline aqueous ferric iron salt solution was manufactured by first preparing a solid mixture having 213.7 g of ferric nitrate nonahydrate ($Fe(NO_3)_3 \cdot 9H_2O$), 250 g of anhydrous potassium carbonate ($K_2CO_3$) and 9.62 g of D-sorbitol. The solid mixture was placed in a beaker with a magnetic stir bar on a magnetic stir plate. While stirring, 793 mL of an aqueous solution having 19.7 g of the disodium salt of EDTA was added to the beaker. The addition of the water resulted in a vigorous reaction that released $CO_2$ gas. The alkaline aqueous ferric iron salt solution was diluted using an aqueous potassium carbonate-bicarbonate buffer at a ratio of 1:25 alkaline aqueous ferric iron salt solution to aqueous potassium carbonate-bicarbonate buffer by adding the alkaline aqueous ferric iron solution into the aqueous potassium carbonate/bicarbonate buffers. The exemplary buffer solution used to dilute the concentrated ferric iron solutions was a 50:50 (vol:vol) mixture of 0.9 M aqueous $K_2CO_3$ and 1.8 M $KHCO_3$ at pH 10.1. Useful ferric iron solutions can be prepared by dilution of the concentrated solution with potassium carbonate-bicarbonate buffer. Useful ferric iron solutions can be prepared by dilution of the concentrated solution with potassium carbonate-bicarbonate buffer where the dilution is 1:1 (vol/vol) up to 1:60 (vol:vol) concentrate:buffer.

Concentrate of the alkaline aqueous ferric iron solutions is stable for at least one year for use in preparation of working solutions by appropriate dilution (e.g., a 1:20 dilution with buffer)

Example 3

Preferred Mole Ratios of Potassium and Ferric Iron and Organic Additives in Concentrated and Dilute Working Solutions Various mole ratios of potassium, sorbitol, EDTA and ferric iron were tested to determine short- and long-term solubility of concentrated aqueous alkaline iron solutions, with the goal of determining preferred mole ratios that maintain high solubility. In these experiments dry solids of all chemicals were mixed and deionized water (10 mL) was added to the mixed solids. All test samples contained 1.3465 g of $Fe(NO_3)_3 \cdot 9H_2O$, which resulted in a final molarity of 0.278 M $Fe(NO_3)_3$. Potassium carbonate, D-sorbitol and $Na_2$-EDTA were added as needed to achieve the mole ratios listed in the Table 2. Upon addition of water to the dry solids a vigorous reaction occurred and either a clear, dark, fully soluble solution or a solution with precipitate of iron oxide particles resulted.

The results of these tests are listed in Table 2. In the absence of sorbitol and EDTA (samples 1-4 in Table 2 below) fully soluble aqueous alkaline ferric iron solutions occurred at K:Fe mole ratios of 9:1 and 12:1, but substantial precipitation of iron oxide particles occurred at lower K:Fe mole ratios (4:1 and 6.6:1). The 9:1 and 12:1 K:Fe solutions remained clear and soluble for 4-5 days but then precipitated after one week. However, 1:20 dilutions of the 9:1 and 12:1 K:Fe concentrates with a potassium carbonate-bicarbonate buffer (0.9M $KHCO_3$:0.45M $K_2CO_3$) remained fully soluble. The K:Fe mole ratios of these dilute solutions are much higher, 138:1 and 141:1 for the diluted 9:1 and 12:1 concentrates, respectively. These results demonstrate that at K:Fe mole ratios>8 the aqueous alkaline ferric iron solutions described herein are inherently highly soluble even in the absence of organic additives. This is a highly unusual result for ferric iron compounds, which are normally virtually insoluble at pH's above 5-6.

In the presence of D-sorbitol and EDTA at 1:10 mole ratios relative to ferric iron (samples 5-8) somewhat different results occurred. The 6.6:1, 9:1 and 12:1 K:Fe concentrated solutions were fully water soluble and remained so for at least 7 days, while the 4:1 K:Fe test precipitated immediately. 1:20 dilutions of these soluble concentrates into the same potassium carbonate-bicarbonate buffer described above remained fully soluble as well. It should be noted that the dilute solutions with high K:Fe ratios described herein are the "working solutions" of aqueous, alkaline ferric salts that are used to scrub hydrogen sulfide and other reduced sulfur compounds from gas streams. Exemplary working solutions are made by diluting concentrates such as those listed in Table 2 with potassium carbonate-bicarbonate buffer (0.9M $KHCO_3$:0.45M $K_2CO_3$) at 1:10, 1:20 or 1:30 dilution ratios.

TABLE 2

| Sample | K:Fe Mole ratio | Sorbitol: Fe Mole ratio | EDTA: Fe Mole ratio | Solution after mixing | Solution after 1 day | Solution after 1 week |
|---|---|---|---|---|---|---|
| 1 | 4:1 | 0 | 0 | PPT | PPT | PPT |
| 2 | 6.6:1 | 0 | 0 | PPT | PPT | PPT |
| 3 | 9:1 | 0 | 0 | Fully soluble, dark brown | Fully soluble, dark brown | PPT |
| 4 | 12:1 | 0 | 0 | Fully soluble, dark brown | Fully soluble, dark brown | PPT |
| 5 | 4:1 | 1:10 | 1:10 | PPT | PPT | PPT |
| 6 | 6.6:1 | 1:10 | 1:10 | Fully soluble, dark brown | Fully soluble, dark brown | Fully soluble, dark brown |
| 7 | 9:1 | 1:10 | 1:10 | Fully soluble, dark brown | Fully soluble, dark brown | Fully soluble, dark brown |
| 8 | 12:1 | 1:10 | 1:10 | Fully soluble, dark brown | Fully soluble, dark brown | Fully soluble, dark brown |

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. An electrochemical cell comprising:
  (a) an anode side comprising an anode and an anolyte;
  (b) a cathode side comprising a cathode and a catholyte;
  (c) a separator separating the anode side from the cathode side; and
  (d) an alkaline aqueous ferric iron salt solution, wherein the alkaline aqueous ferric iron salt solution is at least one of the anolyte and the catholyte, wherein the alkaline aqueous ferric iron salt solution comprises one or more anionic ferric iron-carbonate complexes, and wherein the alkaline aqueous ferric iron salt solution has a pH of at least 8.

2. The electrochemical cell of claim 1, wherein the alkaline aqueous ferric iron salt solution is the catholyte.

3. The electrochemical cell of claim 2, wherein the anolyte comprises one or more of a $Cr^{3+}/Cr^{2+}$ redox couple, a $V^{3+}/V^{2+}$ redox couple, a $Zn/Zn(OH)_4^{2-}$ redox couple, a $TiO^{2+}/Ti^{3+}$ redox couple, and a $Cu^{2+}/Cu$ redox couple.

4. The electrochemical cell of claim 2, wherein electrochemical reactions driving the electrochemical cell comprise:
  a reversible chemical reaction wherein the one or more anionic ferric iron-carbonate complexes are reduced from ferric ions ($Fe^{3+}$) to ferrous ions ($Fe^{2+}$).

5. The electrochemical cell of claim 4, wherein the anolyte comprises a sulfide/sulfur ($S^{2-}/S^0$) redox couple.

6. The electrochemical cell of claim 5, wherein the anode comprises elemental sulfur and the anolyte comprises anionic polysulfides.

7. The electrochemical cell of claim 1, wherein the alkaline aqueous ferric iron salt solution is the anolyte.

8. The electrochemical cell of claim 7, wherein the electrochemical cell is an iron-air battery, and wherein the cathode comprises a bifunctional air-breathing cathode.

9. The electrochemical cell of claim 1, wherein the electrochemical cell is an all-iron electrochemical cell, wherein the catholyte comprises the alkaline aqueous ferric iron salt solution, and wherein the anode comprises zerovalent iron.

10. The electrochemical cell of claim 9, wherein the at least one of the anolyte and the catholyte are free of iron cyanide complexes.

11. The electrochemical cell of claim 10, wherein the electrochemical cell is a redox flow battery.

12. The electrochemical cell of claim 1, wherein a molarity of ferric ions in the alkaline aqueous ferric iron salt solution is from 0.005 to 3.0 mols/L.

13. The electrochemical cell of claim 12, wherein the alkaline aqueous ferric iron salt solution is free of particles.

14. The electrochemical cell of claim 13, wherein the alkaline aqueous ferric iron salt solution is free of ferric-based particles.

15. The electrochemical cell of claim 14, wherein the alkaline aqueous ferric iron salt solution is free of ferric iron oxide particles or ferric iron oxyhydroxide particles.

16. The electrochemical cell of claim 15, wherein a molar ratio of potassium ions to ferric ions in the alkaline aqueous ferric iron salt solution is at least 3.0.

17. The electrochemical cell of claim 16, wherein the alkaline aqueous ferric iron salt solution comprises one or more organic additives, wherein a molar ratio of the ferric ions to the one or more organic additives, in total, is greater than 1.0.

18. The electrochemical cell of claim 17, wherein the alkaline aqueous ferric iron salt solution comprises the one or more organic additives, wherein the molar ratio of the ferric ions to each of the one or more organic additives is greater than 1.0.

19. The electrochemical cell of claim 18, wherein the alkaline aqueous ferric iron salt solution comprises the one or more organic additives, wherein a molar ratio of ferric ion to each organic additive is 2 or more, and wherein the one or more organic additives are selected from a group consisting of a polyol, an extract of a fruit, leaves or roots of the fruit, and any combination thereof, a pectin from any source, and an aminopolycarboxylic acid.

* * * * *